Dec. 1, 1936.  W. R. SCHLAGE  2,062,765
DOORKNOB AND SPINDLE FASTENER
Filed Oct. 22, 1934
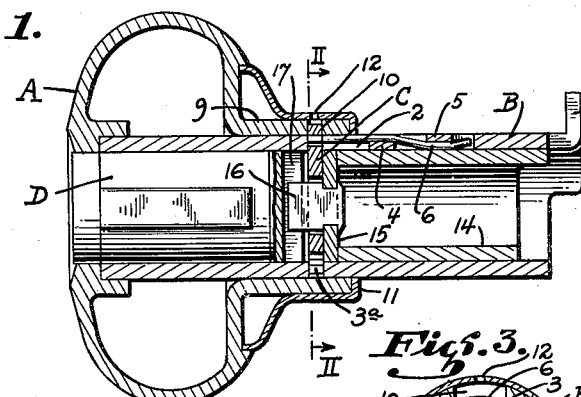
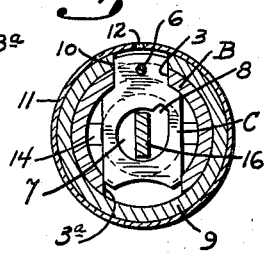
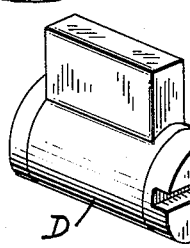
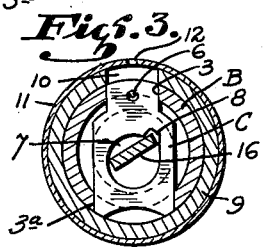
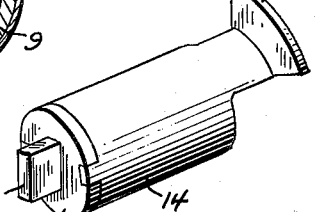
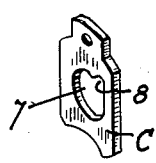
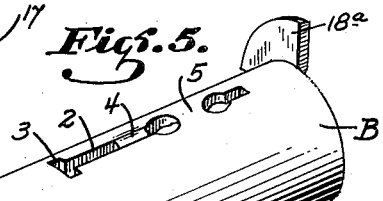
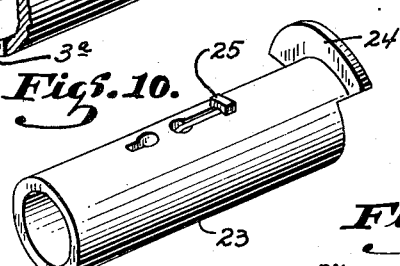
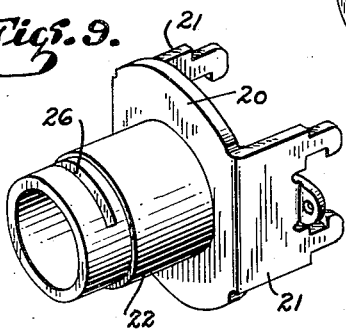
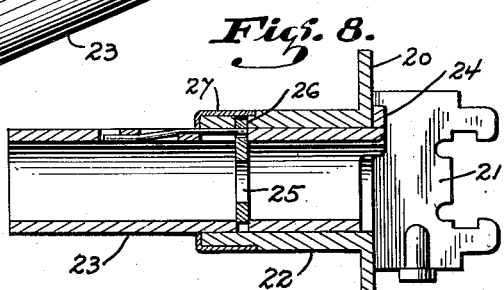
INVENTOR.
Walter R. Schlage.
BY Townsend and Loftus
ATTORNEYS.

Patented Dec. 1, 1936

2,062,765

UNITED STATES PATENT OFFICE 2,062,765

DOORKNOB AND SPINDLE FASTENER

Walter R. Schlage, San Francisco, Calif., assignor to Schlage Lock Co., San Francisco, Calif., a corporation of California Application October 22, 1934, Serial No. 749,387

10 Claims. (Cl. 70—91)

This invention relates to a door knob and spindle fastener and especially to improvements on the type of fastener shown in my former Patent Number 1,621,174, entitled "Doorknob fastener", issued March 15th, 1927.

The type of fastener shown in the above-entitled patent discloses a spring projected fastener which extends radially through a spindle into the shank of a knob to be secured. The spring employed lies within the spindle and as such forms an obstruction for other mechanism which may be placed within the spindle. Further, the fastener proper lacks proper support and guidance.

The object of the present invention is generally to improve and simplify the construction and operation of fasteners of the character described; to provide a fastener which is amply supported and guided; to provide a spring for its actuation which lies within the wall thickness of the metal forming the spindle so as to leave the inner and outer surfaces of the spindle unobstructed; to provide a fastener and an actuating spring which may be quickly and readily assembled in the spindle; to provide a fastener which may be key controlled; and further, to provide a fastener which may also be employed for the purpose of securing the spindle against endwise movement with relation to a lock housing.

The fastener and a mode of using the same is shown by way of illustration in the accompanying drawing, in which—

Fig. 1 is a central vertical longitudinal section through a door knob and spindle, said section showing the manner in which the spindle and knob are interlocked by means of a locking plate.

Fig. 2 is a cross section on line II—II of Fig. 1.

Fig. 3 is a similar cross section showing the locking plate in depressed position to permit removal of the knob.

Fig. 4 is a perspective view of a standard form of key actuated cylinder lock.

Fig. 5 is a perspective view of the knob spindle.

Fig. 6 is a perspective view of a key actuated spindle.

Fig. 7 is a perspective view of the locking plate.

Fig. 8 is a central vertical longitudinal section of a portion of a lock housing and the knob spindle mounted therein, said section showing the manner in which the locking plate may be utilized for the purpose of securing the spindle against endwise movement with relation to the lock housing.

Fig. 9 is a perspective view of a portion of the lock housing shown in Fig. 8.

Fig. 10 is a perspective view showing the type of knob spindle employed in the structure shown in Fig. 8.

Referring to the drawing in detail, and particularly Figs. 1, 5 and 7, A indicates a door knob and B the spindle upon which it is mounted. The spindle disclosed in the present instance is constructed of metal. It is tubular in form and it carries a locking plate C whereby the knob is secured against rotation and endwise movement on the spindle. The locking plate is spring actuated and means must be provided for holding and guiding the locking plate and the spring actuating the same.

To accomplish this a T-shaped slot is formed in one side of the spindle. The leg portion of the slot lies parallel to the longitudinal axis of the spindle, as indicated at 2, and the head portion of the slot is transversely disposed as indicated at 3. The leg portion of the slot is, in this instance, straddled by a pair of spaced bridging members generally indicated at 4 and 5, the bridging member 5 being grooved on its inner surface and the bridging member 4 is grooved on its outer surface; the grooves being of a depth equal to or slightly greater than the thickness of the spring whereby the locking plate is actuated. This spring is clearly shown at 6 in Fig. 1. It is passed over and under the bridging members 4 and 5 and one end of the spring is thus secured. The free end extends through the locking plate and exerts an outward pressure thereon.

The locking plate is best illustrated in Figs. 1, 2, 3 and 7. It is a rectangular-shaped plate with a central opening formed therein which is indicated at 7. This opening is substantially circular but it has a notch 8 formed in one side thereof. The function of the central opening in the notch will later be described.

To properly support and guide the locking plate, the transverse slot is provided and in addition thereto a second transverse slot, which is indicated at 3a. This is formed directly opposite to the slot 3. The slot 3a is wider than the slot 3 and the locking plate is inserted therethrough, and it is at all times guided and supported in the slots 3 and 3a, being radially movable therein; radial movement in an outward direction being obtained by the action of the spring and radial movement in an inward direction being accomplished by depression of the locking plate through means of a tool provided for that purpose. The knob A is provided with a shank 9 and this has a slot formed in it as indicated at 10, which registers with the slot 3; hence when the locking plate is projected by means of the spring it extends into the slot 10 of the knob shank and thereby secures the knob against rotation and against endwise movement on the spindle B. To prevent children, or any unauthorized individual, from tampering with the locking plate a ferrule 11 is provided. This covers the shank of the knob and it is suitably secured thereto. It has a pin-hole opening 12 formed therein and by inserting a pin the pin will engage the upper end of the locking plate; hence by applying proper pressure the locking plate may be depressed and the knob removed.

The important features of the structure so far described are the following: First of all, ample guidance and support for the locking plate is insured as it is always supported and guided by the slots 3 and 3a; secondly, the spring 6 whereby the locking pin is actuated may be constructed of wire and as it lies within the wall thickness of the metal forming the spindle, due to the grooves formed in the bridging members 4 and 5, it registers a clear unobstructed exterior surface and similarly a clear unobstructed inner surface; this being obviously important where other mechanism is to be inserted as shown in this case. For instance, the knob may be provided with a key actuated cylinder lock, such as shown at D in Figs. 1 and 4. Where a cylinder lock of this type is provided, it is also usual to provide a key actuated spindle, such as shown at 14, see Figs. 1 and 6. This spindle has an end plate secured thereto, as shown at 15, and a driving member 16. This driving member projects through the central opening 7 formed in the locking plate and it engages a cross slot 17 formed on the inner end of the plug mounted in the cylinder lock; hence when a key is inserted and the plug is rotated the slot piece 17 will rotate and as it straddles the driving member 16 rotary motion will be transmitted to the driving member and the key actuated spindle 14. This spindle is provided with a roll-back member 18 and the door can thus be opened either by key action or by manual rotation of the knob and the spindle B, as this spindle is also provided with a roll-back member shown at 18a.

The main function of the driving member 16 is that of transmitting motion from the cylinder lock to the spindle 14; but it also serves another and an important function in the present instance, to-wit, that of dogging the locking plate against movement. For instance, when the driving member assumes the position shown in Fig. 2 the locking plate is dogged against depression, thus preventing unauthorized individuals from removing the knob. Again, by inserting a key and rotating the driving member until it assumes the position shown in Fig. 3, depression of the locking plate will be permitted and the knob may thus be removed. The notch 8 formed in the central opening is of importance as it increases the range of movement of the locking plate when the driving member 16 assumes the proper position. Where a key actuated spindle is inserted in the main knob spindle, as shown in Fig. 1, a free and unobstructed inner surface within the spindle B is obviously essential; hence the importance of constructing and positioning the spring 6 as previously described.

While the locking plate has been particularly described as being employed for the purpose of locking a knob against rotation and endwise movement on the spindle, it may also be employed for securing the spindle against endwise movement with relation to a lock housing. In certain types of locks, for instance in the type disclosed in my former Patent Number 1,829,815, entitled "Door lock housing", issued November 3rd, 1931, it is important that the knob spindle be secured against endwise movement. The reasons therefore are as follows.

By referring to Figs. 8 and 9, wherein a portion of the lock housing is shown, 20 indicates one end of the lock housing, 21 side plates formed integral therewith, and 22 a bearing sleeve or hub. This hub is provided for the reception of a knob spindle, such as shown at 23, see Figs. 8 and 10. A roll-back member 24 is formed on the inner end of this spindle and that is engageable with a retractor not here shown, which is slidably mounted between the plates 20 and 21. If there is end play of the spindle 23 with relation to the retractor, it is possible to bind and obstruct the movement of the retractor. On the other hand, if such end play is removed free action of the retractor can always be depended upon; hence by inserting the locking plate in the position shown at 25, see Fig. 8, and by forming a slot 26 in the bearing sleeve of the lock housing into which the locking plate can project, it is possible to secure the spindle 23 against endwise movement with relation to the lock housing and free and independent action of the retractor will be insured.

The slot 26 serves two functions. First that of receiving the locking plate, and secondly that of limiting rotational movement of the spindle; hence the slot is made of a length which limits rotational movement. Such a slot would be unsightly and might be partially clogged or filled with dirt unless properly protected; hence a covering ferrule, such as shown at 27, is provided. This overcomes the unsightly appearance of the slot and obviously excludes dirt and other foreign matter which might otherwise enter.

From the foregoing description it will be noted that the locking plate serves several functions. It is of material improvement over the type of locking plate disclosed in my former patent referred to, as it is larger and it is amply supported and guided due to the slots 3 and 3a provided therefor. The spring actuating the same has been materially improved as it lies wholly within the walls forming the thickness of the metal and as such leaves both the exterior and interior surfaces of the spindle free and unobstructed. The spring and the locking plate are quickly and readily inserted and they are also easily actuated when a knob is to be applied or removed.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:—

1. In a structure of the character described a tubular spindle having a T-shaped slot formed therein, the leg of the T-shaped slot being parallel to the longitudinal axis of the spindle and the head of the slot being transverse thereto, a radially movable locking plate carried by the spindle and guided in the transverse portion of the slot, a pair of bridging members positioned crosswise of the leg portion of the T-shaped slot, one of said bridging members being grooved on the inner surface and the other being grooved on the outer surface, and an elongated spring having its free end in engagement with the locking plate, said spring extending longitudinally of the leg portion of the T-shaped slot and having its opposite end secured by being passed over and under the bridging members and lying in the grooves formed in said members.

2. In a structure of the character described a tubular spindle having a T-shaped slot formed therein, the leg of the T-shaped slot being parallel to the longitudinal axis of the spindle and the head of the slot being transverse thereto, a radially movable locking plate carried by the spindle and guided in the transverse portion of the slot, a pair of bridging members positioned crosswise of the leg portion of the T-shaped slot, one of said bridging members being grooved on the inner surface and the other being grooved on the outer surface, and an elongated spring having its free end in engagement with the locking plate, said spring extending longitudinally of the leg portion of the T-shaped slot and having its opposite end secured by being passed over and under the bridging members and lying in the grooves formed in said members, said grooves having a depth greater than the thickness of the spring member to leave the inner and outer surfaces of the spindle free and unobstructed.

3. In a structure of the character described a tubular spindle having a slot formed therein disposed transversely of the longitudinal axis of the spindle, a second transverse slot formed in the opposite side of the spindle, a radially movable locking plate carried by the spindle and guided in said slots, and an elongated spring positioned parallel to the longitudinal axis of the spindle, one end of the spring having its free end in engagement with the locking plate to exert an outward pressure thereon, said spring having a thickness less than the wall thickness of the metal forming the spindle and lying wholly within said wall thickness, and means securing the opposite end of the spring to the spindle.

4. In a structure of the character described a tubular spindle having a slot formed therein disposed transversely of the longitudinal axis of the spindle, a second transverse slot formed in the opposite side of the spindle, a radially movable locking plate carried by the spindle and guided in said slots, an elongated spring positioned parallel to the longitudinal axis of the spindle, one end of the spring having its free end in engagement with the locking plate to exert an outward pressure thereon, said spring having a thickness less than the wall thickness of the metal forming the spindle and lying wholly within said wall thickness, means securing the opposite end of the spring to the spindle, and a central opening formed in the locking plate.

5. In a structure of the character described a hollow spindle and a knob mounted thereon, a shank on the knob, a slot formed in the spindle transversely of the longitudinal axis of the spindle, a locking plate carried by the spindle and guided in the transverse slot, a spring engageable with the locking plate and exerting an outward pressure thereon to project the plate into a slot formed in the shank of the knob so as to secure the knob on the spindle, said spring being elongated and extending longitudinally of the spindle and lying within the wall thickness of the metal forming the spindle, an opening formed in the locking plate, a key actuated mechanism in the knob, and means projecting into the opening formed in the locking plate, said means being key actuated and adapted to assume two positions, one position in which the locking plate is dogged against depression and a second position in which the locking plate is free to be depressed.

6. In a structure of the character described a hollow spindle and a knob mounted thereon, a shank on the knob, a slot formed in the spindle transversely of the longitudinal axis of the spindle, a locking plate carried by the spindle and guided in the transverse slot, a spring engageable with the locking plate and exerting an outward pressure thereon to project the plate into a slot formed in the shank of the knob so as to secure the knob on the spindle, said spring being elongated and extending longitudinally of the spindle and lying within the wall thickness of the metal forming the spindle, an opening formed in the locking plate, a key actuated mechanism in the knob, a key actuated spindle disposed within the knob spindle, and a bar extending through the opening in the locking plate and forming a driving connection between the key actuated mechanism and the key actuated spindle.

7. In a structure of the character described a hollow spindle and a knob mounted thereon, a shank on the knob, a slot formed in the spindle transversely of the longitudinal axis of the spindle, a locking plate carried by the spindle and guided in the transverse slot, a spring engageable with the locking plate and exerting an outward pressure thereon to project the plate into a slot formed in the shank of the knob so as to secure the knob on the spindle, said spring being elongated and extending longitudinally of the spindle and lying within the wall thickness of the metal forming the spindle, an opening formed in the locking plate, a key actuated mechanism in the knob, a key actuated spindle disposed within the knob spindle, and a bar extending through the opening in the locking plate and forming a driving connection between the key actuated mechanism and the key actuated spindle, said bar adapted to be rotated by the key actuated mechanism and to assume different positions, one of which dogs the locking plate against depression and another which leaves the locking plate free to be depressed.

8. In a structure of the character described a tubular spindle having a slot formed therein disposed transversely of the longitudinal axis of the spindle, a second transverse slot formed in the opposite side of the spindle, a radially movable locking plate carried by the spindle and guided in said slots, and an elongated spring positioned parallel to the longitudinal axis of the spindle, one end of the spring having its free end in engagement with the locking plate to exert an outward pressure thereon.

9. In a structure of the character described a hollow spindle and a knob mounted thereon, a shank on the knob, a slot formed in the spindle transversely of the longitudinal axis of the spindle, a locking plate carried by the spindle and guided in the transverse slot, a spring engageable with the locking plate and exerting an outward pressure thereon to project the plate into a slot formed in the shank of the knob so as to secure the knob on the spindle, said spring being elongated and extending longitudinally of the spindle and lying within the wall thickness of the metal forming the spindle, an opening formed in the locking plate, manually operable means in the knob, said means being operable independent of the knob, and means actuated by said manual means and projecting into the opening formed in the locking plate, said means adapted to assume two positions, one position in which the locking plate is dogged against depression and a second position in which the locking plate is free to be depressed.

10. In a structure of the character described a hollow spindle and a knob mounted thereon, a shank on the knob, a slot formed in the spindle transversely of the longitudinal axis of the spindle, a locking plate carried by the spindle and guided in the transverse slot, a spring engageable with the locking plate and exerting an outward pressure thereon to project the plate into a slot formed in the shank of the knob so as to secure the knob on the spindle, said spring being elongated and extending longitudinally of the spindle and lying within the wall thickness of the metal forming the spindle, an opening formed in the locking plate, a bar extending through the opening formed in the locking plate and manually actuated means in the knob for transmitting a rotary motion to said bar so that the bar may assume one of two positions, one position in which the locking plate is dogged against depression and a second position in which it is free to be depressed.

WALTER R. SCHLAGE.